W. A. JAMES.
MILLING CUTTER.
APPLICATION FILED JAN. 24, 1917.

1,245,726.

Patented Nov. 6, 1917.

WITNESSES
Oliver W. Holmes
C. Bradway

INVENTOR
W. A. James.
BY
ATTORNEYS

UNITED STATES PATENT OFFICE.

WILLIAM ALFRED JAMES, OF WOONSOCKET, RHODE ISLAND.

MILLING-CUTTER.

1,245,726.  Specification of Letters Patent.  Patented Nov. 6, 1917.

Application filed January 24, 1917. Serial No. 144,211.

*To all whom it may concern:*

Be it known that I, WILLIAM A. JAMES, a citizen of the United States, and a resident of Woonsocket, in the county of Providence and State of Rhode Island, have invented a new and Improved Milling-Cutter, of which the following is a full, clear, and exact description.

This invention relates to milling cutters, reamers, taps and the like, of that type having inserted teeth.

The invention has for its general objects to improve the construction of tools of this character so as to be reliable and efficient in use, comparatively simple and inexpensive to manufacture, and so designed as to firmly clamp the teeth in position.

A more specific object of the invention is the provision of a tool made of relatively movable body sections having in the circumferences alining slots to receive the teeth, and also having interengaging means whereby relative rotation of the body sections is produced when the sections are drawn axially together, so that a torsional effect is exerted on the inserted teeth to effectively grip the same.

With such objects in view, and others which will appear as the description proceeds, the invention comprises various novel features of construction and arrangement of parts which will be set forth with particularity in the following description and claims appended hereto.

In the accompanying drawing, which illustrates certain embodiments of the invention and wherein similar characters of reference indicate corresponding parts in all the views, Figure 1 is a plan view of a tool with one of the body sections partly broken away;

Figure 1:
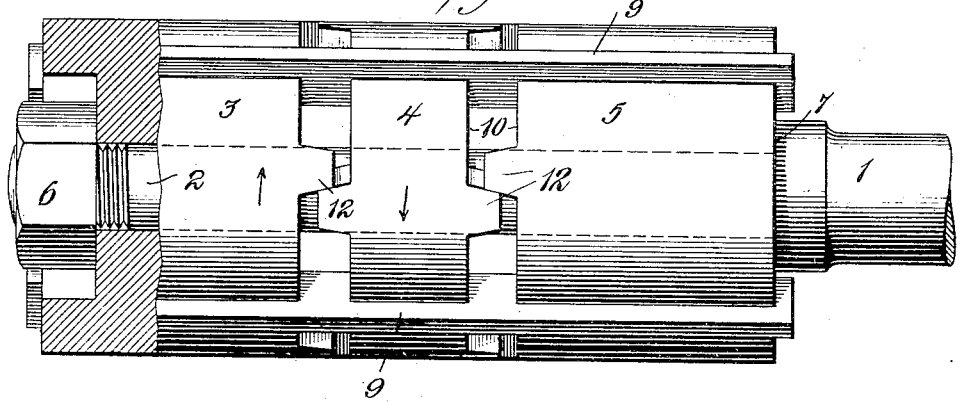
Figure 2:
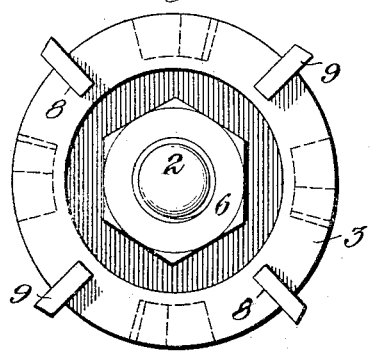
Fig. 2 is an end view of the tool.

Referring to the drawing, 1 designates the arbor of the tool which has a reduced portion 2 on which are mounted the body sections 3, 4 and 5 of the tool, each section being cylindrical and having a central opening for assembling on the arbor. The extremity of the arbor has a nut 6 whereby the body sections are clamped together and against the shoulder 7 of the arbor. The circumference of each body section has grooves or slots 8, and the slots of the various sections are normally in alinement so as to receive the cutters or equivalent elements 9. On the transverse faces 10 of the body sections are beveled lugs 12 which are so arranged that when the body sections are moved axially by the turning of the nut 6 adjacent body sections tend to revolve in opposite directions, as indicated by the arrows. The effect of this is that the tool elements 9 are tightly clamped in the slots of the body sections. The body sections by their relative opposite rotary movement tend to produce a torsional twist on the tool elements, which results in a tight binding of the tool elements in the slots.

Figure 4:
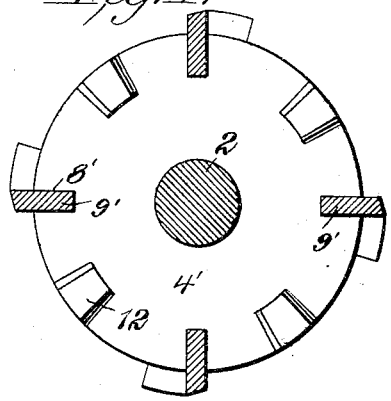
Fig. 4 is a transverse section on the line 4—4, Fig. 3.
Figure 3:
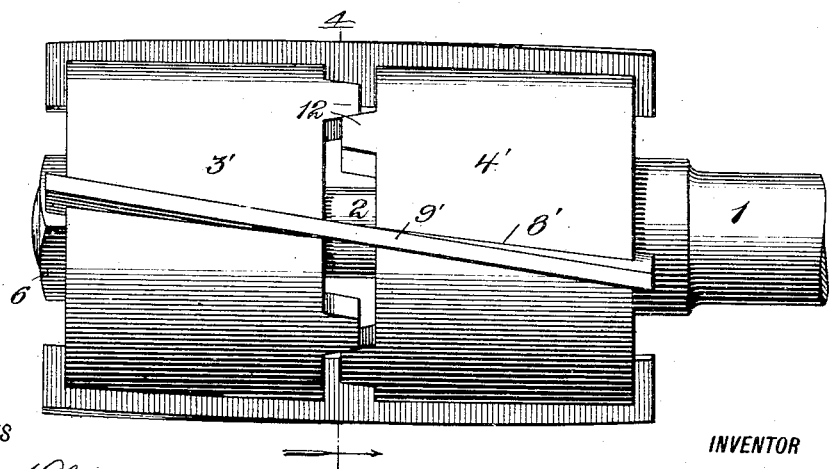
Fig. 3 is a plan view of a modified form of tool.

In Figs. 3 and 4 the body sections 3′ and 4′ have oblique slots 8′ in which are set the tool elements 9′. As the body sections are drawn together, the tendency is to throw the slots out of alinement, as in the case of Fig. 1, whereby the walls of the slot in the section 3′ will engage one side of the tool elements and the walls of the slot in the body section 4′ will engage the opposite side of the tool elements. In this manner the tool elements will be firmly clamped in position. To unfasten the tool elements the nut 6 need be turned a small amount so as to allow sufficient play between the body sections to release the grip on the tool elements, when the latter can be lifted out of the slots.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A tool of the class described comprising a body made of sections, an arbor on which the sections are mounted to move axially and circumferentially, said body sections having alining slots, tool elements disposed in the alining slots, and means for producing relative rotation and axial movement of the body sections to clamp the tool elements in the slots.

2. A tool of the class described comprising a body made of sections, an arbor on which the sections are mounted to move axially and circumferentially, said body sections having alining slots, tool elements disposed in the alining slots, beveled lugs on the body sections, and means for forcing the body sections toward each other to cause the lugs to engage and produce relative rotation of the body sections for clamping the tool elements in the slots.

3. A tool of the class described comprising independently movable body sections each having slots in its periphery, means for supporting the body sections with their slots in alinement, tool elements in the alining slots, means for moving the body sections toward each other, and interengaging means on the body sections, whereby their movement toward each other causes relative rotary movement to bind the tool elements in the slots.

WILLIAM ALFRED JAMES.

Copies of this patent may be obtained for five cents each, by addressing the "Commissioner of Patents, Washington, D. C."